(12) United States Patent
Hayashi et al.

(10) Patent No.: US 11,053,406 B2
(45) Date of Patent: Jul. 6, 2021

(54) INK FOR INKJET TEXTILE PRINTING, INK SET, AND METHOD FOR PRODUCING PRINTED ITEM

(71) Applicant: RISO KAGAKU CORPORATION, Tokyo (JP)

(72) Inventors: Akiko Hayashi, Ibaraki (JP); Takahisa Yamazaki, Ibaraki (JP); Kokoro Kinoe, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/454,669

(22) Filed: Jun. 27, 2019

(65) Prior Publication Data
US 2020/0002561 A1 Jan. 2, 2020

(30) Foreign Application Priority Data

Jun. 28, 2018 (JP) .............................. JP2018-123214
Jun. 19, 2019 (JP) .............................. JP2019-113503

(51) Int. Cl.
| | |
|---|---|
| *B41J 11/00* | (2006.01) |
| *B41J 11/40* | (2006.01) |
| *C09D 11/54* | (2014.01) |
| *C09D 11/322* | (2014.01) |
| *C09D 11/037* | (2014.01) |
| *D06P 5/30* | (2006.01) |
| *D06P 5/00* | (2006.01) |
| *D06P 3/52* | (2006.01) |
| *C09D 11/033* | (2014.01) |
| *B41J 3/407* | (2006.01) |
| *C09D 11/102* | (2014.01) |

(52) U.S. Cl.
CPC ............. *C09D 11/54* (2013.01); *B41J 3/4078* (2013.01); *B41J 11/0015* (2013.01); *C09D 11/033* (2013.01); *C09D 11/037* (2013.01); *C09D 11/102* (2013.01); *C09D 11/322* (2013.01); *D06P 3/52* (2013.01); *D06P 5/002* (2013.01); *D06P 5/30* (2013.01)

(58) Field of Classification Search
CPC ..... B41J 3/4078; B41J 11/0015; C09D 11/54; C09D 11/033; C09D 11/037; C09D 11/322; D06P 3/52; D06P 5/002; D06P 5/30
See application file for complete search history.

(56) References Cited

U.S. PATENT DOCUMENTS

| | | | | |
|---|---|---|---|---|
| 8,328,340 B2 * | 12/2012 | Ogawa | ................... | C09D 11/30 |
| | | | | 347/100 |
| 2010/0091052 A1 | 4/2010 | Ogawa et al. | | |
| 2010/0214352 A1 * | 8/2010 | Tsunoda | ................... | D06P 1/44 |
| | | | | 347/21 |
| 2018/0265723 A1 * | 9/2018 | Kagata | ................... | C09D 11/30 |
| 2018/0265725 A1 * | 9/2018 | Kagata | ................... | C09D 11/38 |

FOREIGN PATENT DOCUMENTS

| | | |
|---|---|---|
| JP | 2009-30014 | 2/2009 |
| JP | 2010-031402 | 2/2010 |

* cited by examiner

*Primary Examiner* — Jason S Uhlenhake
(74) *Attorney, Agent, or Firm* — Greenblum & Bernstein, P.L.C.

(57) ABSTRACT

An ink for inkjet textile printing is disclosed that contains a pigment, a water-dispersible urethane resin having a film elongation of 600% to 2,000%, a water-soluble organic solvent and water, wherein the weight ratio between the pigment and the water-dispersible urethane resin is from 1:3 to 1:16. An ink set and a method for producing a printed item are also disclosed.

19 Claims, No Drawings

INK FOR INKJET TEXTILE PRINTING, INK SET, AND METHOD FOR PRODUCING PRINTED ITEM

CROSS REFERENCE TO RELATED APPLICATIONS

This application is based upon and claims the benefit of priority from the prior Japanese Patent Application No. 2018-123214, filed on Jun. 28, 2018, the entire contents of which are incorporated by reference herein, and the prior Japanese Patent Application No. 2019-113503, filed on Jun. 19, 2019 the entire contents of which are incorporated by reference herein.

BACKGROUND OF THE INVENTION

Field of the Invention

The present invention relates to an ink for inkjet textile printing, an ink set, and a method for producing a printed item.

Description of the Related Art

Examples of methods that are used for printing images such as text, pictures or designs onto textiles such as woven fabric and nonwoven fabric include screen printing methods and roller textile printing methods. However, these textile printing methods require a screen frame or an engraved roller or the like to be prepared for each image, meaning they may be unsuitable for small-volume production of multiple items, or for cases in which immediate alteration of the images are required.

In contrast, inkjet textile printing in which inkjet recording technology is used attracts considerable attention in recent years, since it may enable immediate alteration of the image as desired, using computer-based image processing rather than using a screen frame or engraved roller or the like, and, therefore, excellent productivity for small-volume production of multiple items may be obtained, and it may also enable the ink to be discharged directly from the inkjet head onto the fabric, and may enable formation of high-quality images at high resolution.

Examples of known inks that can be used in inkjet textile printing include the inks disclosed in JP 2009-30014 A and JP 2010-31402 A.

SUMMARY OF THE INVENTION

With respect to textile printing in which printing is performed onto, for example, fibrous products, in those cases where printing is performed onto a fabric used for clothing or the like, in general, it is desired that the image portion exhibits sufficiently high image fastness to prevent separation from the fabric.

However, even using an ink aiming at obtaining printed textile items having superior fastness, in those cases where an image is printed to a fabric containing a fiber such as polyester fiber that has less unevenness in the fiber surface than cotton, the ink film may be sometimes unable to conform to stretching of the fabric and detaches, and, therefore, there is room for further improvement in the fastness properties.

JP 2010-31402 A provides an aqueous pigment ink containing a water-soluble copolymer obtained by using an amine to neutralize and solubilize a copolymer obtained by performing a polymerization using an unsaturated vinyl monomer having a carboxyl group as a copolymerization component, with the objects of suppressing bleeding while preventing ink overflow, thereby enabling prints having excellent rear surface image depiction to be obtained. This ink was developed targeting superior image quality; however, in those cases where images are formed on fabrics having comparatively high elasticity, a problem may arises in that satisfactory rubbing fastness cannot be obtained.

Embodiments of the present invention have been developed in light of these circumstances.

An embodiment of the present invention provides an ink for inkjet textile printing comprising a pigment, a water-dispersible urethane resin having a film elongation of 600% to 2,000%, a water-soluble organic solvent and water, wherein a weight ratio between the pigment and the water-dispersible urethane resin is from 1:3 to 1:16.

Another embodiment of the present invention provides an ink set comprising the ink for inkjet textile printing as described above, and a pretreatment liquid.

Another embodiment of the present invention provides a method for producing a printed item, the method comprising applying the ink for inkjet textile printing as described above onto a substrate using an inkjet recording method.

DETAILED DESCRIPTION OF THE EMBODIMENTS

Embodiments according to the present invention are described below, but the present invention is not limited to the following embodiments, and various modifications may be made without departing from the scope of the invention.

The inventors of the present invention have discovered that in an inkjet textile printing ink containing at least a pigment, a water-dispersible resin, a water-soluble organic solvent and water, in those cases where a water-dispersible urethane resin having a film elongation of 600% to 2,000% is used as a water-dispersible resin, and the weight ratio between the pigment and the water-dispersible urethane resin having a film elongation of 600% to 2,000% is from 1:3 to 1:16, a printed textile item having particularly superior rubbing fastness may be obtained.

An ink for inkjet textile printing (hereinafter also referred to as simply "ink") according to an embodiment may be an ink that is discharged by an inkjet method onto the surface of a substrate (such as a fabric) that acts as a recording medium. In order to improve the rubbing fastness, in the ink of an embodiment, a urethane resin having a film elongation of 600% to 2,000% may be used as a water-dispersible resin included in the ink, and a weight ratio between the pigment and the water-dispersible resin may be from 1:3 to 1:16.

Each of the components that may be included in the ink for inkjet textile printing according to embodiments of the present invention is described below in detail.

The ink for inkjet textile printing may contain a pigment as a colorant. Any pigment typically used in this technical field may be used as this pigment.

Examples of the pigment which may be used include organic pigments, examples thereof including azo pigments, phthalocyanine pigments, polycyclic pigments and dye lake pigments; and inorganic pigments, examples thereof including carbon blacks and metal oxides. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide.

Any one of these pigments may be used alone, or a combination of two or more pigments may be used.

A pigment dispersant which may be conventionally used, typified by, for example, polymeric dispersants and surfactants is preferably used, from the view point of stable dispersion of the pigment in the ink.

Examples of commercially available polymeric dispersants include the TEGO Dispers series, examples of which include TEGO Dispers 740W, TEGO Dispers 750W, TEGO Dispers 755W, TEGO Dispers 757W and TEGO Dispers 760 (all product names manufactured by Evonik Industries AG), the Solsperse series, examples of which include Solsperse 20000, Solsperse 27000, Solsperse 41000, Solsperse 41090, Solsperse 43000, Solsperse 44000 and Solsperse 46000 (all product names manufactured by The Lubrizol Corporation), the Joncryl series, examples of which include Joncryl 57. Joncryl 60, Joncryl 62, Joncryl 63, Joncryl 71 and Joncryl 501 (all product names manufactured by Johnson Polymer, Inc.), as well as DISPERBYK-102, DISPERBYK-185, DISPERBYK-190, DISPERBYK-193 and DISPERBYK-199 (all product names manufactured by BYK Additives & Instruments GmbH), FUJI SP A-54 (a product name manufactured by Fuji Pigment Co., Ltd.), and Polyvinylpyrrolidone K-30 and Polyvinylpyrrolidone K-90 (both product names manufactured by DKS Co. Ltd.).

Examples of the surfactant-type dispersants include anionic surfactants such as the DEMOL series, examples of which include DEMOL EP, DEMOL N, DEMOL RN. DEMOL NL, DEMOL RNL and DEMOL T-45 (all product names manufactured by Kao Corporation), and nonionic surfactants such as the EMULGEN series, examples of which include EMULGEN A-60, EMULGEN A-90, EMULGEN A-500, EMULGEN B-40, EMULGEN L-40 and EMULGEN 420 (all product names manufactured by Kao Corporation).

One of these pigment dispersants may be used alone of a combination of a plurality of these pigment dispersants may be used.

In those cases where a pigment dispersant is used, there are no particular limitations on the amount of the pigment dispersant added to the ink, which may vary depending on the type of dispersant used, but generally, the amount of the active component (solid fraction) of the pigment dispersant, expressed as a weight ratio relative to a value of 1 for the pigment, is preferably within a range from 0.005 to 0.8.

Self-dispersing pigments in which the pigment surface has been modified with hydrophilic functional groups may be used.

The self-dispersing pigment is preferably a pigment in which a hydrophilic functional group having ionicity has been introduced at the pigment surface. By anionically or cationically charging the pigment surface, the pigment particles can be stably dispersed in water by electrostatic repulsion. Preferred examples of anionic functional groups include a sulfonate group, carboxyl group, carbonyl group, hydroxyl group, phosphonate group or phosphate group. Preferred examples of cationic functional groups include quaternary ammonium groups and quaternary phosphonium groups and the like.

Specific examples of commercially available self-dispersing pigments include FUJI SP BLACK 8154 (a product name manufactured by Fuji Pigment Co., Ltd.), the CAB-O-JET series, examples thereof including CAB-O-JET 200, CAB-O-JET 300, CAB-O-JET 250C, CAB-O-JET 260M and CAB-O-JET 270 (all product names manufactured by Cabot Corporation), and BONJET BLACK CW-1S, BONJET BLACK CW-2 and BONJET BLACK CW-3 (all product names manufactured by Orient Chemical Industries Co., Ltd.).

Microencapsulated pigments in which the pigment is coated with a resin may be used.

From the viewpoints of the discharge stability and the storage stability, the average particle size of the pigment particles in the ink, expressed as the volume-based average value in a particle size distribution measured by a dynamic light-scattering method, is preferably not more than 300 nm, more preferably not more than 150 nm, and even more preferably 100 nm or less.

The blend amount of the pigment may vary depending on the type of pigment used, but from the viewpoints of the ink color development and ink discharge properties, the amount of the pigment relative to the total mass of the ink may be adjusted, for example, within the range of at least 0.3% by mass but not more than 5% by mass, and is preferably adjusted within the range from at least 0.3% by mass to less than 5% by mass.

In a case where the amount of the pigment is at least 0.3% by mass relative to the total mass of the ink, favorable legibility may be ensured without excessively increasing the ink transfer amount, and, therefore, favorable texture may be more easily obtained. In a case where the amount of the pigment is not more than 5% by mass relative to the total mass of the ink, the ink viscosity may be less likely to become overly high, and discharge anomalies may be less likely to occur. It is thought because the ink viscosity suitable for discharge from the nozzles of a typical inkjet head is generally set to a value within a range from 3 to 10 mPa·s (at normal temperature), in those cases where the amount of the pigment is not more than 5% by mass relative to the total mass of the ink, an ink viscosity that satisfies this range may be more easily obtained, and, therefore discharge anomalies caused by nozzle blockages may be more easily suppressed.

The ink preferably contains a water-dispersible resin.

A water-dispersible resin can be dispersed in water in particulate form without dissolving in water.

There are no particular limitations on the water-dispersible resin, but from the viewpoint of the inkjet dischargeability, a resin having an average particle size of 300 nm or less is preferred.

The ink preferably contains a water-dispersible urethane resin. There are no particular limitations on preferred water-dispersible urethane resins, provided the resin has a urethane skeleton and is water-dispersible. Preferable examples of water-dispersible urethane resins include anionic urethane resins having an anionic functional group. Examples of anionic functional groups include a carboxyl group, sulfo group and hydroxyl group.

Examples of commercially available resins having a urethane skeleton include Impranil DLP-R, Impranil DLC-F, Impranil DLU, Impranil DL2611, Impranil DLH and Impranil DL1537 (all product names manufactured by Sumika Covestro Urethane Co., Ltd.), SUPERFLEX 130, SUPER- FLEX 460, SUPERFLEX 460S, SUPERFLEX 470 and SUPERFLEX 500M (all product names manufactured by DKS Co., Ltd.), and HYDRAN WLS-201 (a product name manufactured by DIC Corporation).

One of these water-dispersible urethane resins may be used alone, or a combination of a plurality of these water-dispersible urethane resins may be used.

From the viewpoint of improving the ability to conform to stretching of the fabric used as a substrate, the water-dispersible resin preferably has a film elongation within a range from 600%0/to 2,000%, and more preferably within a range from 1,500 to 1,800%. In some embodiments, the water-dispersible urethane resin preferably has a film elongation within a range from 600% to 2,000%, and more preferably within a range from 1,500 to 1,800%.

The film elongation of the water-dispersible resin can be measured in the following manner. First, the water-dispersible resin is applied to a polytetrafluoroethylene sheet in an amount sufficient to achieve a dried film thickness of 500 μm, the applied resin is then dried at 23° C. for 15 hours, and then at 80° C. for 6 hours and at 120° C. for 20 minutes, and the resulting film is then detached from the sheet to complete production of a resin film. This resin film is cut into a pillar shape having a width of 2 cm and a length of 4 cm to obtain a test piece. Using a tensile tester with the measurement temperature set to 20° C. and the measurement speed set to 200 mm/min, the obtained resin film test piece is stretched, the length of the stretched resin film test piece when the resin film test piece ruptures is measured, and the value of the ratio of this rupture length relative to the original length expressed as a percentage is deemed the film elongation. As the tensile tester, the Tensilon Universal Tester RTC-1225A (manufactured by Orientec Co., Ltd.) may be used.

In order to achieve satisfactory coating of the pigment contained in the ink to ensure superior fastness properties, the weight ratio between the pigment and the water-dispersible resin is preferably within a range from 1:3 to 1:16. In some embodiments, the weight ratio between the pigment and the water-dispersible urethane resin is preferably within a range from 1:3 to 1:16.

Moreover, the tensile strength of the water-dispersible resin is preferably not more than 10 $N/mm^2$. In some embodiments, the tensile strength of the water-dispersible urethane resin is preferably not more than 10 $N/mm^2$. When the tensile strength of the water-dispersible urethane resin is not more than 10 $N/mm^2$, even in those cases where the stretching of the fabric is too great, detachment of the ink film from the fabric surface as a result of rupture of the resin itself may be more easily suppressed, and excellent fastness may be more easily maintained.

The tensile strength of the water-dispersible resin can be measured in the following manner. First, the water-dispersible resin is applied to a polytetrafluoroethylene sheet in an amount sufficient to achieve a dried film thickness of 500 μm, the applied resin is then dried at 23° C. for 15 hours, and then at 80° C. for 6 hours and at 120° C. for 20 minutes, and the resulting film is then detached from the sheet to complete production of a resin film. This resin film is cut into a pillar shape having a width of 2 cm and a length of 4 cm to obtain a test piece. Using a tensile tester with the measurement temperature set to 20° C. and the measurement speed set to 200 mm/min, the obtained resin film test piece is stretched, the maximum load until the resin film test piece ruptures is measured, and the value obtained by dividing the measured maximum load by the cross sectional area of the resin film test piece is deemed the tensile strength. As the tensile tester, the Tensilon Universal Tester RTC-1225A (manufactured by Orientec Co., Ltd.) may be used.

The ink for inkjet textile printing preferably contains a water-soluble organic solvent (hereafter sometimes referred to as a "water-soluble solvent").

Any of organic compounds that are liquid at room temperature and can be dissolved in water can be used as the water-soluble solvent, and the use of a water-soluble organic solvent that mixes uniformly with an equal volume of water at 1 atmosphere and 20° C. is preferable.

Examples of organic solvents that may be used include lower alcohols, examples of which include methanol, ethanol, 1-propanol, isopropanol, 1-butanol, 2-butanol, isobutanol and 2-methyl-2-propanol; diols, examples of which include ethylene glycol, diethylene glycol, triethylene glycol, tetraethylene glycol, polyethylene glycol, propylene glycol, dipropylene glycol, tripropylene glycol, polypropylene glycol, 1,3-propanediol, 1,3-butanediol, 2,3-butanediol, 1,4-butanediol, 3-methyl-1,3-butanediol, 1,5-pentanediol, 1,6-hexanediol, 2-methyl-2,4-pentanediol, 2-ethyl-1,3-hexanediol, and 2,2,4-trimethyl-1,3-pentanediol; triols, examples of which include 1,2,6-hexanetriol, 1,2,4-butanetriol, 1,2,3-butanetriol, 1,2,5-pentanetriol and 1,3,5-pentanetriol; glycerols, examples of which include glycerol, diglycerol, triglycerol and polyglycerol; acetins such as monoacetin and diacetin; glycol ethers, examples of which include ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, diethylene glycol monobenzyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; as well as triethanolamine, 1-methyl-2-pyrrolidone, 1,3-dimethyl-2-imidazolidinone, β-thiodiglycol and sulfolane.

The boiling point of the water-soluble organic solvent is preferably 100° C. or higher, and more preferably 150° C. or higher.

One of these water-soluble solvents may be used alone, or a combination of two or more solvents may be used provided the solvents form a single phase with water. The amount of the water-soluble solvent in the ink, or the total amount of all the solvents in those cases where two or more solvents are used, is preferably from 5 to 50% by mass, and more preferably from 10 to 35% by mass.

Among these water-soluble solvents, if diethylene glycol monobenzyl ether is used, then the action of the phenyl group in the structural formula may improve the affinity and may further enhance the rubbing fastness. This effect may be particularly marked in those cases where, for example, a fabric including a polyester fiber is used as the substrate.

The ink for inkjet textile printing preferably contains water. There are no particular limitations on the water, but water having as few ionic components as possible is preferred. In particular, form the viewpoint of the ink storage stability, the amount of polyvalent metal ions such as calcium ions is preferably kept low. Examples of the water include ion-exchanged water, distilled water and ultra-pure water.

From the viewpoint of viscosity adjustment, the amount of water included in the ink is preferably from 20 to 80% by mass, and more preferably from 30 to 70% by mass.

Depending on the ink properties required, the ink for inkjet textile printing may also contain one or more additive components, examples of which include surface tension adjusters (surfactants), additives, thickening assistants, pH adjusters, antioxidants and preservatives, provided they do not impair the effects of the ink.

Examples of surface tension adjusters that may be used include anionic surfactants, cationic surfactants, amphoteric surfactants and nonionic surfactants, as well as polymer-based, silicone-based and fluorine-based surfactants.

Adding a surfactant may facilitate stable discharge of the ink by inkjet methods, and may also make it easier to appropriately control the penetration of the ink, and is consequently preferred. The amount added of the surfactant (the total amount of surfactants in those cases when a surfactant is also used as a pigment dispersant) may vary depending on the type of surfactant used, but from the viewpoints of the ink surface tension and the rate of ink penetration into substrates such as fabrics, the amount is preferably within a range from 0.1 to 10% by mass of the ink.

There are no particular limitations on the silicone-based surfactants that may be used as additives, but examples of preferred compounds include polysiloxane-based compounds such as polyether-modified siloxanes and polyether-modified alkylsiloxanes.

Specific examples of commercially available silicone-based surfactants include BYK-307 and BYK-347 (both product names manufactured by BYK Additives & Instruments GmbH).

Polysiloxane-based compounds may exhibit high hydrophobicity as a result of containing siloxane linkages, and it is thought that because the exposed portion of the surfactant on the surface is a hydrophobic group, the hydrophobicity tends to increase. As a result, by using a polysiloxane-based compound as a surface tension adjuster, the wet rubbing fastness of the printed items may be improved.

An electrolyte may also be added to the ink to adjust the viscosity or pH of the ink. Examples of the electrolyte include sodium sulfate, potassium hydrogen phosphate, sodium citrate, potassium tartrate and sodium borate. One electrolyte may be used, or combinations of two or more electrolytes may be used. Other compounds such as sulfuric acid, nitric acid, acetic acid, sodium hydroxide, potassium hydroxide, ammonium hydroxide and triethanolamine may also be used as ink thickening assistants or pH adjusters.

By adding an antioxidant, oxidation of the ink components can be prevented, and the storage stability of the ink can be improved. Examples of antioxidants that may be used include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented and the storage stability of the ink can be improved. Examples of preservatives that may be used include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

The ink for inkjet textile printing can be produced, for example, by appropriately selecting the components described above, combining the components in a container, and then using a stirrer such as a magnetic stirrer or a three-one motor to stir the components until a uniform mixture is obtained. Depending on the components used, stirring may be performed while heating at a prescribed temperature in order to accelerate the reaction rate.

Next is a description of a method for producing a printed item using the ink for inkjet textile printing according to some embodiments as described above.

There are no particular limitations on the method used for producing a printed item using the ink for inkjet textile printing. The ink for inkjet textile printing of an embodiment as described above is preferably printed onto a substrate such as a fabric using an inkjet recording method. The method for producing a printed item in some embodiments includes applying the ink for inkjet textile printing of some embodiments as described above, onto a substrate such as a fabric, using an inkjet recording method (hereinafter also referred to as the 'printing step'). The inkjet printer used may employ any of various systems, including a piezo system, electrostatic system or thermal system, and for example, liquid droplets of the ink may be discharged from the inkjet head based on a digital signal, with the discharged ink droplets being adhered to the substrate.

Fabrics can be used favorably as the substrate that acts as the recording medium. Examples of fabrics that may be used include fabrics formed using any natural and/or synthetic fibers such as cotton, silk, wool, linen, nylon, polyester, rayon, acetate and cupra. The substrate is not limited to woven fabrics of these natural and synthetic fibers, and knitted fabrics and the like may also be used. A fabric including polyester fibers may be used.

In the method for producing a printed item using the inkjet ink for textile printing according to some embodiments as described above, a step of applying a pretreatment liquid onto the substrate (hereinafter also referred to as the "pretreatment liquid application step") may be performed prior to the printing step using the ink for inkjet textile printing. The pretreatment liquid may be applied by, for example, coating or the like. The pretreatment liquid is preferably applied to at least the print region of the surface of the substrate, for example, by coating or the like. An ink set in some embodiments may include the ink for inkjet textile printing as described above and a pretreatment liquid. In a case where an ink set including the ink for inkjet textile printing described above and a pretreatment liquid is used, the pretreatment liquid may be applied as a pretreatment prior to printing.

The region to which the pretreatment liquid is applied may be, for example, the entire substrate surface including the print region. The amount applied of the pretreatment liquid, per unit area of the substrate, is preferably within a range from 1 to 500 $g/m^2$, and more preferably from 10 to 200 $g/m^2$.

There are no particular limitations on the pretreatment liquid, and examples thereof include those containing a coagulant or a filler. Examples of coagulants include metal salts and cationic compounds. Examples of fillers include as silica. From the viewpoint of improving the color development, the pretreatment liquid preferably contains a coagulant, and the pretreatment liquid more preferably contains at least one selected from the group consisting of a metal salt and a cationic compound. From the viewpoints of the fastness and color development properties, the amount applied of the pretreatment liquid, expressed as a mass of the coagulant, is preferably from 0.1 to 50 g/m$^2$, more preferably from 1 to 25 g/m$^2$, and even more preferably from 3 to 15 g/m$^2$.

Examples of metal salts that may be used as a coagulant in the pretreatment liquid include polyvalent metal salts. Examples of these polyvalent metal salts include salts of calcium, magnesium, copper, nickel, zinc, and barium and the like, but in those cases where the pretreatment liquid is sprayed onto the substrate such as a fabric and then fixed to the fabric by ironing, the pretreatment liquid itself is preferably colorless, and considering the likelihood of the fabric contacting the skin or the like, an inert calcium salt is particularly preferred.

From the viewpoints of the ink film formability and fixability, the concentration of the polyvalent metal salt in the pretreatment liquid is preferably from about 1% by mass to about 25% by mass, and is more preferably from about 2% by mass to about 15% by mass.

The cationic compound may be, for example, a water-soluble cationic compound. The cationic compound may be, for example, a cationic polymer, and is preferably a water-soluble cationic polymer. Examples of the cationic compound include a cationic polymer such as poly(2-hydroxypropyldimethylammonium chloride). One cationic compound may be used singly, or two more thereof may be used in combination.

From the viewpoints of the color development and texture, the concentration of the cationic compound in the pretreatment liquid is preferably from about 0.1% by mass to about 20% by mass, and is more preferably from about 1% by mass to about 15% by mass.

From the viewpoints of reducing fluff formation on the substrate and improving the ink fixing properties, the pretreatment liquid preferably includes a water-dispersible resin. There are no particular limitations on the water-dispersible resin, and examples of resins that may be used include acrylic resins, acrylic-styrene resins, urethane resins, vinyl acetate resins, acrylic-vinyl acetate resins, and combinations of two or more of these resins.

Specific examples include SUPERFLEX 107M, SUPERFLEX 300, SUPERFLEX 361, SUPERFLEX E2000, SUPERFLEX E4000 and SUPERFLEX E4800 from the SUPERFLEX series (all product names manufactured by DKS Co., Ltd.), ADEKA BONTIGHTER HUX-950 and ADEKA BONTIGHTER HUX-290H from the ADEKA BONTIGHTER series (all product names manufactured by ADEKA Corporation), as well as TAKELAC W-512A6 (a product name manufactured by Mitsui Chemicals & SKC Polyurethanes Inc.), and Vinyblan 1225 and Vinyblan 1245L (both product names manufactured by Nissin Chemical Industry Co., Ltd.), and these resins may be used individually, or a plurality of resins may be combined.

Although there are no particular limitations on the water included in the pretreatment liquid, a water containing a small amount of impurities is preferred, and examples include pure water or ultra-pure water such as ion-exchanged water or distilled water. There are no particular limitations on the amount of water, but from the viewpoint of viscosity adjustment, the amount is preferably adjusted as appropriate.

From the viewpoints of viscosity adjustment and moisture retention, a water-soluble organic solvent may also be added. Examples of water-soluble organic solvents that may be used in the pretreatment liquid include the same water-soluble organic solvents as those mentioned above for inclusion in the ink for inkjet textile printing.

Moreover, the types of additives typically added to inks, such as preservatives, viscosity adjusters, antioxidants and surfactants, may also be added as appropriate to the pretreatment liquid. Examples of these types of additives that may be used include the same additives as those mentioned above for addition to the ink for inkjet textile printing.

In those cases where a metal salt is used as the coagulant in the pretreatment liquid, if, a fabric containing a polyester fiber is used as the substrate, crystals of the metal salt may tend to grow and form particles, which can result in unevenness in the ink film and weaken the abrasion resistance.

In contrast, if a cationic compound such as poly(2-hydroxypropyldimethylammonium chloride) is used as the coagulant, then the degree of ink aggregation may be higher and the compound may be less likely to form particles, meaning the fastness properties may be less likely to deteriorate. Accordingly, the image density of the printed items may be improved, and the rubbing fastness may also be enhanced.

As described above, the ink for inkjet textile printing according to an embodiment of the present invention can be printed to a recording medium such as a fabric using an inkjet textile printing method.

The ink for inkjet textile printing according to some embodiments preferably includes a water-dispersible urethane resin having a film elongation within a range from 600% to 2,000%, and more preferably within a range from 1,500% to 1,800%, as a water-dispersible resin. In some embodiments, by including a water-dispersible urethane resin having a film elongation within a range from 600% to 2,000%, and preferably within a range from 1,500% to 1,800%, in the ink for inkjet textile printing, it is possible to produce a printed item having excellent fastness properties in which the ink that has been printed to a substrate such as a fabric is able to conform to stretching of the fabric or the like.

In some embodiments, by ensuring that the weight ratio between the pigment and the water-dispersible urethane resin having a film elongation of 600% to 2,000% is within a range from 1:3 to 1:16, the pigment contained in the ink may be adequately coated with the water-dispersible resin, and, therefore, superior fastness properties may be obtained.

In some embodiments, in a case where the tensile strength of the water-dispersible urethane resin is not more than 10 N/mm$^2$, when a fabric is used as the substrate, even in those cases where considerable stretching of the fabric occurs, detachment of the ink film from the fabric surface as a result of rupture of the resin itself may be suppressed, and, therefore, excellent fastness may be maintained.

In some embodiments, if an anionic water-dispersible urethane resin is used as the water-dispersible urethane resin, then resin components may be more easily retained on the substrate surface as a result of aggregation, and therefore the fixability of the pigment may be improved.

In some embodiments, if a polysiloxane-based compound is used as an additive, then the high hydrophobicity of the added siloxane may enhance the hydrophobicity of the ink, and as a result, the wet rubbing fastness of the printed items may be enhanced.

In some embodiments, among the various water-soluble solvents, if diethylene glycol monobenzvl ether (benzyl diglycol) is used in the ink, then the action of the phenyl group in the structural formula may improve the affinity and further enhance the rubbing fastness. This effect may be particularly marked in those cases where, for example, a fabric including a polyester fiber is used as the substrate.

In a case where a cationic compound is included to the pretreatment liquid, the cationic compound may be less likely to form particles and the fastness properties may be less likely to deteriorate, and, therefore, the color development properties may be improved with only a small amount.

In particular, if poly(2-hydroxypropyldimethylammonium chloride) is used as the cationic compound, then the cohesive force is powerful, which is desirable.

In some embodiments, if the blend amount of the pigment in the ink is adjusted to an amount within a range from at least 0.3% by mass to less than 5% by mass relative to the total mass of the ink, then the ink color development properties and the ink discharge properties may be improved.

EXAMPLES

The present invention is described below using a series of examples, but the present invention is in no way limited by these examples.

Printed items produced using the ink for inkjet textile printing were subjected to evaluation tests for color development, texture, dry rubbing fastness and wet rubbing fastness.

The various components and corresponding blend amounts for pretreatment liquids A to C used in the evaluation tests are shown below in Table 1, the various components and corresponding blend amounts for inks 1 to 17 used in Examples 1 to 22 are shown below in Table 2, the various components and corresponding blend amounts for inks 18 to 21 used in Comparative Examples 1 to 4 are shown below in Table 3, the evaluation results for Examples 1 to 22 are shown below in Table 4, and the evaluation results for Comparative Examples 1 to 4 are shown below in Table 5.

<Preparation of Pretreatment Liquids>

The components shown in Table 1 were placed in a container and stirred thoroughly using a three-one motor (manufactured by Shinto Scientific Co., Ltd.) until the mixture appeared uniform, thus obtaining a series of pretreatment liquids shown in Table 1.

The value for each component shown in Table 1 indicates % by mass, and the solid fraction of the cationic polymer and the proportion of the cationic compound that represents the active component were both listed as percentages.

Details of the various components listed in Table 1 are as follows.

Cationic Polymer (Coagulant)
Poly(2-hydroxypropyldimethylammonium chloride): manufactured by DKS Co., Ltd.
Surfactant
Surfynol 465: manufactured by Nissin Chemical Co., Ltd., a nonionic surfactant (solid fraction: 100% by mass)
Metal Salt
Calcium nitrate tetrahydrate: manufactured by FUJIFILM Wako Pure Chemical Corporation
Water
Ion-exchanged water

TABLE 1

| | Raw materials | Pretreatment liquid A | Pretreatment liquid B | Pretreatment liquid C |
|---|---|---|---|---|
| Cationic polymer | poly(2-hydroxypropyldimethylammonium chloride) | 9.0 | 0.2 | |
| Surfactant | Surfynol 465 | 3.0 | 3.0 | |
| Metal salt | Calcium nitrate tetrahydrate | | | 15.0 |
| Water | Ion-exchanged water | 88.0 | 96.8 | 85.0 |
| | | 100.0 | 100.0 | 100.0 |

<Preparation of Inks for Inkjet Textile Printing>

The components shown in Tables 2 and 3 were placed in a container and stirred thoroughly using a three-one motor (manufactured by Shinto Scientific Co., Ltd.) until the mixture appeared uniform, and the mixture was then filtered through a membrane filter with a pore size of 0.8 µm to remove coarse particles, thus obtaining a series of inks for inkjet textile printing show n in Table 2 and Table 3.

The value for each component shown in Table 2 or 3 indicates % by mass, the film elongation indicates the value of the ratio of stretched length at rupture relative to the original length expressed as a percentage (%), and the strength of the water-dispersible resins is shown as the tensile strength (N/mm$^2$).

Details of the various components listed in Tables 2 and 3 are as follows. Table 2 is a composition table relating to the inks 1 to 17 used in Examples 1 to 22, and Table 3 is a composition table relating to the inks 18 to 21 used in Comparative Examples 1 to 4.

(Table 2 Component Details)
Pigment Dispersion
FUJI SP BLACK 8154: manufactured by Fuji Pigment Co., Ltd., a self-dispersing pigment dispersion (pigment component: 19.0%)
BONJET BLACK CW-2: manufactured by Orient Chemical Industries Co., Ltd., a self-dispersing pigment dispersion (pigment component: 15.0%)
Water-Dispersible Resins
SUPERFLEX 460: manufactured by DKS Co., Ltd., a water-dispersible urethane resin (anionic)
SUPERFLEX 500M: manufactured by DKS Co., Ltd., a water-dispersible urethane resin (nonionic)

Impranil DLP-R: manufactured by Sumika Covestro Urethane Co., Ltd., a water-dispersible urethane resin (anionic)

Impranil DLH: manufactured by Sumika Covestro Urethane Co., Ltd., a water-dispersible urethane resin (anionic)

Surfactant

OLFINE E1010: manufactured by Nissin Chemical Industry Co., Ltd., a nonionic surfactant Additives BYK-307: manufactured by BYK Additives & Instruments GmbH, a polyether-modified alkylsiloxane BYK-347: manufactured by BYK Additives & Instruments GmbH, a polyether-modified siloxane Water-Soluble Solvents 1,2-hexanediol: manufactured by FUJIFILM Wako Pure Chemical Corporation Diethylene glycol: manufactured by FUJIFILM Wako Pure Chemical Corporation Benzyl diglycol: manufactured by Nippon Nyukazai Co., Ltd.

Triethylene glycol: manufactured by Kanto Chemical Co., Inc.

Glycerol: manufactured by FUJIFILM Wako Pure Chemical Corporation

Water

Ion-exchanged water (Table 3 Component Details)

Pigment Dispersion

FUJI SP BLACK 8154: manufactured by Fuji Pigment Co., Ltd., a self-dispersing pigment dispersion (pigment component: 19.0%)

Water-Dispersible Resins

SUPERFLEX 460: manufactured by DKS Co., Ltd., a water-dispersible urethane resin (anionic)

SUPERFLEX 420: manufactured by DKS Co., Ltd., a water-dispersible urethane resin (anionic)

Neocryl XK-190XP: manufactured by Kusumoto Chemicals, Ltd., a water-dispersible acrylic resin (anionic)

Impranil DL2611: manufactured by Sumika Covestro Urethane Co., Ltd., a water-dispersible urethane resin (anionic)

Surfactant

OLFINE E1010: manufactured by Nissin Chemical Industry Co., Ltd., a nonionic surfactant Water-Soluble Solvents Glycerol: manufactured by FUJIFILM Wako Pure Chemical Corporation Water Ion-exchanged water The film elongation values and the tensile strength values of the water-dispersible urethane resins recorded in Tables 2 and 3 were obtained in the following manner.

The water-dispersible urethane resin was applied to a polytetrafluoroethylene sheet in an amount sufficient to achieve a dried film thickness of 500 μm, the applied resin was then dried at 23° C. for 15 hours, and then at 80° C. for 6 hours and at 120° C. for 20 minutes, and the resulting film was then detached from the sheet to complete production of a resin film. This resin film is cut into a pillar shape having a width of 2 cm and a length of 4 cm to obtain a test piece. Using the thus obtained resin fill test pieces, the film elongation and the tensile strength were measured in the following manner.

Using a Tensilon Universal Tester RTC-1225A (manufactured by Orientec Co., Ltd.) with the measurement temperature set to 20° C. and the measurement speed set to 200 mm/min, the resin film test piece was stretched, the length of the stretched resin film test piece when the resin film ruptured was measured, and the value of the ratio of this rupture length relative to the original length expressed as a percentage was recorded as the film elongation ("elongation" in the tables).

Using a Tensilon Universal Tester RTC-1225A (manufactured by Orientec Co., Ltd.) with the measurement temperature set to 20° C. and the measurement speed set to 200 mm/min, the resin film test piece was stretched, the maximum load until the resin film test piece ruptured was measured, and the value obtained by dividing the measured maximum load by the cross sectional area of the resin film test piece was recorded as the tensile strength.

TABLE 2

| | Raw materials | Ionicity | Pigment (%) | Resin (%) | Elongation (%) | Tensile strength (N/mm$^2$) | Ink 1 | Ink 2 | Ink 3 | Ink 4 | Ink 5 | Ink 6 | Ink 7 | Ink 8 | Ink 9 |
|---|---|---|---|---|---|---|---|---|---|---|---|---|---|---|---|
| Pigment dispersions | FUJI SP Black 8154 | | 19.0 | | | | 10.5 | 10.5 | 10.5 | 10.5 | | 10.5 | 5.3 | 2.6 | 10.5 |
| | BONJET BLACK CW-2 | | 15.0 | | | | | | | | 13.3 | | | | |
| Water-dispersible resins | SUPERFLEX 460 | anionic | | 38.0 | 750 | 25 | 21.1 | 21.1 | 15.8 | 42.1 | 21.1 | | 21.1 | 21.1 | |
| | SUPERFLEX 500M | nonionic | | 45.0 | 1100 | 18 | | | | | | 17.8 | | | |
| | Impranil DLP-R | anionic | | 50.1 | 1600 | 10 | | | | | | | | | 16.0 |
| | Impranil DLH | anionic | | 40.3 | 700 | 10 | | | | | | | | | |
| Surfactant | | | OLFINE E1010 | | | | 0.5 | 1.1 | 0.5 | 0.5 | 0.5 | 0.5 | 0.5 | 0.5 | 0.5 |
| Additives | | | BYK-307 | | | | | | | | | | | | |
| | | | BYK-347 | | | | | | | | | | | | |
| Water-soluble solvents | | | 1,2-hexanediol | | | | | | | 1.0 | | | | | |
| | | | Diethylene glycol | | | | | | | | | | | | |
| | | | Benzyl diglycol | | | | | | | | | | | | |
| | | | Triethylene glycol | | | | | | | | | | | | |
| | | | Glycerol | | | | 10.0 | 10.0 | 10.0 | 10.0 | 10.0 | 10.0 | 10.0 | 10.0 | 10.0 |
| Water | | | Ion-exchanged water | | | | 57.9 | 57.3 | 62.2 | 36.9 | 55.1 | 61.2 | 63.1 | 65.8 | 63.0 |
| | | | Total | | | | 100.0 | 100.0 | 100.0 | 100.0 | 100.0 | 100.0 | 100.0 | 100.0 | 100.0 |
| | | | Pigment Units: % by mass | | | | 2.0 | 2.0 | 2.0 | 2.0 | 2.0 | 2.0 | 1.0 | 0.5 | 2.0 |
| | | | Water-dispersible resin Units: % by mass | | | | 8.0 | 8.0 | 6.0 | 16.0 | 8.0 | 8.0 | 8.0 | 8.0 | 8.0 |
| | | | Pigment:water-dispersible resin | | | | 1:4 | 1:4 | 1:3 | 1:8 | 1:4 | 1:4 | 1:8 | 1:16 | 1:4 |

TABLE 2-continued

| | Raw materials | Ionicity | Pigment (%) | Resin (%) | Elongation (%) | Tensile strength (N/mm²) | Ink 10 | Ink 11 | Ink 12 | Ink 13 | Ink 14 | Ink 15 | Ink 16 | Ink 17 |
|---|---|---|---|---|---|---|---|---|---|---|---|---|---|---|
| Pigment dispersions | FUJI SP Black 8154 | | 19.0 | | | | 10.5 | 10.5 | 10.5 | 10.5 | 10.5 | 5.2 | 10.5 | 10.5 |
| | BONJET BLACK CW-2 | | 15.0 | | | | | | | | | | | |
| Water-dispersible resins | SUPERFLEX 460 | anionic | | 38.0 | 750 | 25 | | | | | 21.1 | 21.1 | 21.1 | 21.1 | 21.1 |
| | SUPERFLEX 500M | non-ionic | | 45.0 | 1100 | 18 | | | | | | | | |
| | Impranil DLP-R | anionic | | 50.1 | 1600 | 10 | | | | 16.0 | | | | |
| | Impranil DLH | anionic | | 40.3 | 700 | 10 | 19.9 | 19.9 | | | | | | |
| Surfactant | OLFINE E1010 | | | | | | 0.5 | 0.5 | 0.5 | 0.5 | 0.5 | 0.5 | 0.5 | 0.5 |
| Additives | BYK-307 | | | | | | | | | | 1.0 | 3.0 | 1.0 | |
| | BYK-347 | | | | | | | | | | | | | 1.0 |
| Water-soluble solvents | 1,2-hexanediol | | | | | | | | | | 1.0 | | 1.0 | |
| | Diethylene glycol | | | | | | | | | | 4.0 | | 4.0 | |
| | Benzyl diglycol | | | | | | | | | | | | | 10.0 |
| | Triethylene glycol | | | | | | | | 10.0 | | | | | |
| | Glycerol | | | | | | 10.0 | 5.0 | | 16.0 | 16.0 | 16.0 | 16.0 | |
| Water | Ion-exchanged water | | | | | | 59.1 | 64.1 | 63.0 | 45.9 | 48.9 | 56.2 | 45.9 | 57.9 |
| | Total | | | | | | 100.0 | 100.0 | 100.0 | 100.0 | 100.0 | 100.0 | 100.0 | 100.0 |
| | Pigment Units: % by mass | | | | | | 2.0 | 2.0 | 2.0 | 2.0 | 2.0 | 1.0 | 2.0 | 2.0 |
| | Water-dispersible resin Units: % by mass | | | | | | 8.0 | 8.0 | 8.0 | 8.0 | 8.0 | 8.0 | 8.0 | 8.0 |
| | Pigment:water-dispersible resin | | | | | | 1:4 | 1:4 | 1:4 | 1:4 | 1:4 | 1:8 | 1:4 | 1:4 |

TABLE 3

| | Raw materials | Ionicity | Pigment (%) | Resin (%) | Elongation (%) | Tensile strength (N/mm²) | Ink 18 | Ink 19 | Ink 20 | Ink 21 |
|---|---|---|---|---|---|---|---|---|---|---|
| Pigment dispersion | FUJI SP Black 8154 | | 19.0 | | | | 10.5 | 10.5 | 10.5 | 10.5 |
| Water dispersible resins | SUPERFLEX 460 | anionic | | 38.0 | 750 | 25 | 10.5 | | | |
| | SUPERFLEX 420 | anionic | | 32.0 | 290 | 32 | | 25.0 | | |
| | Neocryl XK-190XP | anionic | | 45.0 | — | — | | | 17.8 | |
| | Impranil DL2611 | anionic | | 40.0 | 400 | 40 | | | | 20.0 |
| Surfactant | OLFINE E1010 | | | | | | 0.5 | 0.5 | 0.5 | 0.5 |
| Water-soluble solvent | Glycerol | | | | | | 10.0 | 10.0 | 10.0 | 10.0 |
| Water | Ion-exchanged water | | | | | | 68.5 | 54.0 | 61.2 | 59.0 |
| | Total | | | | | | 100.0 | 100.0 | 100.0 | 100.0 |
| | Pigment Units: % by mass | | | | | | 2.0 | 2.0 | 2.0 | 2.0 |
| | Water-dispersible resin Units: % by mass | | | | | | 4.0 | 8.0 | 8.0 | 8.0 |
| | Pigment:water-dispersible resin | | | | | | 1:2 | 1:4 | 1:4 | 1:4 |

<Pretreatment Step>

Using a piece of a 100% polyester white knit T-shirt that had been cut to dimensions of 210 mm×74 mm as a test piece, the pretreatment liquid A to C prepared using the blend amounts shown in Table 1 was applied to the entire surface of the test piece using an air brush. The coating amount of the pretreatment liquid was set to 70% of the fabric weight. Following application of the pretreatment liquid, the test piece was heated at 180° C. for 60 seconds using a Hotronix Fusion heat press.

<Production of Printed Textile Items>

One of the inks 1 to 21 produced using the blend amounts shown in Table 2 or 3 was loaded into an inkjet printer MMP813BT-C (manufactured by Mastermind Inc.) and printed onto the test piece that had been subjected to the above pretreatment step. The printed image was a monochromatic solid image, and the amount of ink transfer was set to about 20 g/m². Following printing, the test piece was heated at 150° C. for 60 seconds using the Hotronix Fusion heat press.

<Evaluation Methods>

Each of the produced printed items was evaluated for color development, texture, dry rubbing fastness and wet rubbing fastness. The evaluation results are shown in Tables 4 and 5.

Color Development

The OD value of the solid image portion of the produced printed item was measured using an X-Rite eXact device (manufactured by X-Rite Inc). The color development of the image portion of the produced printed item was evaluated against the following evaluation criteria.
(Evaluation criteria)
A: OD value of 1.2 or greater
B: OD value of at least 1.1 but less than 1.2
C: OD value of at least 1.0 but less than 1.1
D: OD value of at less than 1.0
Texture
The texture of the solid image portion of the produced printed item was subjected to a sensory evaluation. The image portion of the produced printed item was evaluated by touch, with the texture of the image portion being evaluated against the following evaluation criteria.
(Evaluation Criteria)
A: the texture of the fabric is unchanged
B: the texture of the fabric is slightly different, but softness is maintained
C: the texture of the fabric is somewhat different, but softness is maintained
D: the fabric feels stiff
Dry Rubbing Fastness
The produced printed textile item was subjected to a dry rubbing test in accordance with the method prescribed in JIS L0849, using a Gakushin-type rubbing tester RT-200 (manufactured by Daiei Kagaku Seiki Mfg. Co., Ltd.). The test involved fitting a 100% cotton Kanakin No. 3 cloth to the tester, performing 100 back and forth rubbing repetitions with no additional weight, and then evaluating the degree of staining using a staining grey scale.
S: grade 4-5 or higher
A: at least grade 4 but less than grade 4-5
B: at least grade 3-4 but less than grade 4
C: at least grade 3 but less than grade 3-4
D: less than grade 3
Wet Rubbing Fastness
The produced printed textile item was subjected to a wet rubbing test in accordance with the method prescribed in JIS L0849, using a Gakushin-type rubbing tester RT-200 (manufactured by Daiei Kagaku Seiki Mfg. Co., Ltd.). The test involved fitting a 100% cotton Kanakin No. 3 cloth that had been wet with an amount of ion-exchanged water of the same weight as the cloth to the tester, performing 100 back and forth rubbing repetitions with no additional weight, and then evaluating the degree of staining using a staining grey scale.
S: grade 4-5 or higher
A: at least grade 4 but less than grade 4-5
B: at least grade 3-4 but less than grade 4
C: at least grade 3 but less than grade 3-4
D: less than grade 3

TABLE 4

|  | Example 1 Pretreatment liquid A Ink 1 | Example 2 Pretreatment liquid A Ink 2 | Example 3 Pretreatment liquid A Ink 3 | Example 4 Pretreatment liquid A Ink 4 | Example 5 Pretreatment liquid A Ink 5 | Example 6 Pretreatment liquid A Ink 6 | Example 7 Pretreatment liquid A Ink 7 | Example 8 Pretreatment liquid A Ink 8 |
|---|---|---|---|---|---|---|---|---|
| Ink transfer amount g/m$^2$ | 16 | 16 | 16 | 16 | 16 | 16 | 16 | 16 |
| Color development (OD value) | A | A | A | A | A | A | B | B |
| Texture | A | A | A | A | A | A | A | A |
| Dry rubbing fastness | B | B | B | A | B | C | B | B |
| Wet rubbing fastness | A | A | B | A | B | B | A | B |

|  | Example 9 Pretreatment liquid A Ink 8 | Example 10 Pretreament liquid A Ink 8 | Example 11 Pretreatment liquid B Ink 1 | Example 12 Pretreatment liquid A Ink 9 | Example 13 Pretreatment liquid A Ink 10 | Example 14 Pretreatment liquid A Ink 11 | Example 15 Pretreatment liquid A Ink 12 |
|---|---|---|---|---|---|---|---|
| Ink transfer amount g/m$^2$ | 32 | 64 | 16 | 16 | 16 | 16 | 16 |
| Color development (OD value) | A | A | A | A | A | A | A |
| Texture | A | B | B | A | A | A | A |
| Dry rubbing fastness | B | A | B | A | A | A | A |
| Wet rubbing fastness | A | A | A | S | A | A | S |

|  | Example 16 Pretreatment liquid A Ink 13 | Example 17 Pretreament liquid A Ink 14 | Example 18 Pretreatment liquid A Ink 15 | Example 19 Pretreament liquid A Ink 16 | Example 20 Pretreatment liquid A Ink 17 | Example 21 none Ink 1 | Example 22 Pretreatment liquid C Ink 1 |
|---|---|---|---|---|---|---|---|
| Ink transfer amount g/m$^2$ | 16 | 16 | 16 | 16 | 16 | 16 | 16 |
| Color development (OD value) | A | A | A | A | A | C | A |
| Texture | A | A | A | A | A | A | A |
| Dry rubbing fastness | A | A | A | A | A | A | C |
| Wet rubbing fastness | S | S | S | S | S | A | C |

TABLE 5

|  | Comparative Example 1 Pretreatment liquid A Ink 18 | Comparative Example 2 Pretreatment liquid A Ink 19 | Comparative Example 3 Pretreatment liquid A Ink 20 | Comparative Example 4 Pretreatment liquid A Ink 21 |
|---|---|---|---|---|
| Ink transfer amount g/m$^2$ | 16 | 16 | 16 | 16 |
| Color development (OD value) | A | A | A | A |
| Texture | A | A | A | A |
| Dry rubbing fastness | D | D | D | D |
| Wet rubbing fastness | D | D | D | D |

<Evaluation Results>

Evaluation Results of Examples 1 to 22

First, the evaluation results of Examples 1 to 22 are considered.

As shown in Table 4, it is evident that each of the inks for inkjet textile printing of Examples 1 to 22 exhibited favorable results with no practical problems for all of the evaluations for color development, texture, dry rubbing fastness and wet rubbing fastness.

In each of Examples 1 to 22, it was shown that using a water-dispersible urethane resin having a film elongation within a range from 600% to 2,000%, and setting the weight ratio between the pigment and the water-dispersible resin within a range from 1:3 to 1:16, the ink film was able to conform to stretching of the substrate and was unlikely to rupture, and the pigment was able to be adequately coated with the resin, meaning printed textile items having excellent rubbing fastness were able to be obtained. Examples 1 to 22 also exhibited favorable results for the evaluations of color development and texture.

Example 6 had a C evaluation for the dry rubbing fastness, but it is thought that this is because the water-dispersible resin included in the ink 6 used in Example 6 was nonionic, and the pigment fixability on the surface of the text piece as a result of aggregation was slightly inferior compared with the anionic water-dispersible resins used in Examples 1 to 5 and Examples 7 to 17.

In Examples 12 and 15, the wet rubbing fastness yielded an S evaluation, and it is thought that this is because a water-dispersible resin having a film elongation of 1,600% and a tensile strength of not more than 10 N/mm$^2$ was added to the inks 9 and 12 used in these examples, enabling the ink film to conform to stretching of the fabric of the test piece, thereby suppressing detachment of the ink film and enhancing the wet rubbing fastness.

In Examples 16 to 19, the wet rubbing fastness yielded an S evaluation, and it is thought that this is because a polysiloxane-based compound (either a polyether-modified siloxane or a polyether-modified alkylsiloxane) was added as an additive to the inks 13 to 16 used in these examples, thereby improving the hydrophobicity and enhancing the wet rubbing fastness.

In Example 20, the wet rubbing fastness yielded an S evaluation, and it is thought that this is because benzyl diglycol (diethylene glycol monobenzyl ether) was used as a water-soluble solvent, thereby improving the affinity with the polyester fibers in the test piece and enhancing the wet rubbing fastness.

Examples 1 to 20 and 22 to which a pretreatment liquid was applied exhibited superior color development evaluations compared with Example 21 to which a pretreatment liquid was not applied. It is thought that because Examples 1 to 20 and 22 had a pretreatment liquid coated onto the test piece, the image density improved.

In Example 22, both the dry rubbing fastness and the wet rubbing fastness yielded C evaluations, whereas Example 1 which also used ink 1, which was also used in Example 22, exhibited superior evaluation results for the dry rubbing fastness and the wet rubbing fastness than Example 22. In Example 22, it is thought that because a pretreatment liquid containing a metal salt was used on the test piece including polyester fibers, crystals of the metal salt were more likely to grow and form particles, thereby causing unevenness in the ink film that resulted in a deterioration in the dry rubbing fastness and the wet rubbing fastness compared with Example 1.

Further, although Comparative Examples 1 to 4 exhibited excellent A evaluations for both the color development and texture evaluations, the dry rubbing fastness and wet rubbing fastness evaluations all returned D evaluations, which were considerably inferior to the evaluations obtained for Examples 1 to 22, and unsatisfactory from a practical application perspective.

Evaluation Results of Comparative Examples 1 to 4

Next, the evaluation results of Comparative Examples 1 to 4 are considered.

Comparing the ink 18 used in Comparative Example 1 with the inks 1 to 17, whereas the blend ratio between the pigment and the water-dispersible resin was 1:2 in the ink 18, the blend ratio between the pigment and the water-dispersible resin was within a range from 1:3 to 1:16 in the inks 1 to 17.

Based on this difference, it is thought that the blend amount of the water-dispersible resin in Comparative Example 1 was low, resulting in the pigment being inadequately coated with the water-dispersible resin, and therefore the dry rubbing fastness and the wet rubbing fastness deteriorated.

Comparing the inks 19 and 21 used in Comparative Examples 2 and 4 with the inks 1 to 17, whereas the film elongation of the water-dispersible resins included in the inks 19 and 21 was less than 600%, the film elongation of the water-dispersible resins in the inks 1 to 17 was at least 600% in each case.

Based on this difference, it is thought that the film elongation of the water-dispersible resin was low in Comparative Examples 2 and 4, meaning the ink film was more prone to rupture, and therefore the dry rubbing fastness and the wet rubbing fastness deteriorated.

Comparing the ink 20 used in Comparative Example 3 with the inks 1 to 17, whereas the ink 20 used an acrylic resin, instead of a urethane resin, as the water-dispersible resin, each of the inks 1 to 17 used a urethane resin as the water-dispersible resin.

Based on this difference, it is thought that because the water-dispersible resin in Comparative Example 3 was not a urethane resin having a film elongation within a range from 600% to 2,000%, the ink film was unable to conform to stretching of the fabric of the test piece, resulting in a deterioration in the dry rubbing fastness and the wet rubbing fastness.

Embodiments of the present invention include the following. However, the present invention is not limited to the following embodiments.

<1> An ink for inkjet textile printing comprising a pigment, a water-dispersible urethane resin having a film elongation of 600% to 2,000%, a water-soluble organic solvent and water, wherein a weight ratio between the pigment and the water-dispersible urethane resin is from 1:3 to 1:16.

<2> The ink for inkjet textile printing according to <1>, wherein a tensile strength of the water-dispersible urethane resin is not more than 10 N/mm$^2$.

<3> The ink for inkjet textile printing according to <1> or <2>, wherein the water-dispersible urethane resin comprises an anionic water-dispersible urethane resin.

<4> The ink for inkjet textile printing according to any one of <1> to <3>, wherein a film elongation of the water-dispersible urethane resin is from 1,500% to 1,800%.

<5> The ink for inkjet textile printing according to any one of <1> to <4>, further comprising at least one compound selected from the group consisting of a polyether-modified siloxane and a polyether-modified alkylsiloxane.

<6> The ink for inkjet textile printing according to any one of <1> to <5>, wherein the water-soluble organic solvent comprises a benzyl diglycol.

<7> An ink set comprising:
the ink for inkjet textile printing according to any one of <1> to <6>, and
a pretreatment liquid comprising water and a coagulant.

<8> The ink set according to <7>, wherein the coagulant comprises at least one selected from the group consisting of a cationic compound and a metal salt.

<9> The ink set according to <8>, wherein the coagulant comprises a cationic polymer.

<10> The ink set according to <9>, wherein the cationic polymer comprises poly(2-hydroxypropyldimethylammonium chloride).

<11> A method for producing a printed item, the method comprising applying the ink for inkjet textile printing according to any one of <1> to <6> onto a fabric using an inkjet recording method.

<12> The method for producing a printed item according to <11>, the method further comprising applying a pretreatment liquid comprising water and a coagulant onto the substrate, prior to the application of the ink for inkjet textile printing onto the substrate.

<13> The method for producing a printed item according to <12>, wherein the coagulant comprises at least one selected from the group consisting of a cationic compound and a metal salt.

<14> The method for producing a printed item according to <13>, wherein the coagulant comprises a cationic polymer.

<15> The method for producing a printed item according to <14>, wherein the cationic polymer comprises poly(2-hydroxypropyldimethylammonium chloride).

<16> The method for producing a printed item according to any one of <11> to <15>, wherein the fabric comprises polyester fibers.

According to some embodiments of the present invention, it is possible to provide an ink for inkjet textile printing with which printed textile items having excellent fastness properties may be produced. According to some embodiments of the present invention, it is possible to provide an ink set with which printed textile items having excellent fastness properties may be produced. According to some embodiments of the present invention, it is possible to provide an ink set with which printed textile items having excellent fastness properties may be produced a method for producing a printed item with which printed textile items having excellent fastness properties may be produced.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An ink for inkjet textile printing comprising a pigment, a water-dispersible urethane resin having a film elongation of 600% to 2,000%, a water-soluble organic solvent and water, wherein
a weight ratio between the pigment and the water-dispersible urethane resin is from 1:4 to 1:16.

2. The ink for inkjet textile printing according to claim 1, wherein a tensile strength of the water-dispersible urethane resin is not more than 10 N/mm$^2$.

3. The ink for inkjet textile printing according to claim 1, wherein the water-dispersible urethane resin comprises an anionic water-dispersible urethane resin.

4. The ink for inkjet textile printing according to claim 1, wherein a film elongation of the water-dispersible urethane resin is from 1,500% to 1,800%.

5. The ink for inkjet textile printing according to claim 1, further comprising at least one compound selected from the group consisting of a polyether-modified siloxane and a polyether-modified alkylsiloxane.

6. The ink for inkjet textile printing according to claim 1, wherein the water-soluble organic solvent comprises a benzyl diglycol.

7. An ink set comprising:
the ink for inkjet textile printing according to claim 1, and
a pretreatment liquid comprising water and a coagulant.

8. The ink set according to claim 7, wherein the coagulant comprises at least one selected from the group consisting of a cationic compound and a metal salt.

9. The ink set according to claim 8, wherein the coagulant comprises a cationic polymer.

10. The ink set according to claim 9, wherein the cationic polymer comprises poly(2-hydroxypropyldimethylammonium chloride).

11. A method for producing a printed item, the method comprising applying the ink for inkjet textile printing according to claim 1 onto a fabric using an inkjet recording method.

12. The method for producing a printed item according to claim 11, the method further comprising applying a pretreatment liquid comprising water and a coagulant onto the substrate, prior to the application of the ink for inkjet textile printing onto the substrate.

13. The method for producing a printed item according to claim 12, wherein the coagulant comprises at least one selected from the group consisting of a cationic compound and a metal salt.

14. The method for producing a printed item according to claim 13, wherein the coagulant comprises a cationic polymer.

15. The method for producing a printed item according to claim 14, wherein the cationic polymer comprises poly(2-hydroxypropyldimethylammonium chloride).

16. The method for producing a printed item according to claim 11, wherein the fabric comprises polyester fibers.

17. An ink for inkjet textile printing comprising a pigment, a water-dispersible urethane resin having a film elongation of 600% to 2,000%, a water-soluble organic solvent and water, wherein
a weight ratio between the pigment and the water-dispersible urethane resin is from 1:3 to 1:16, and
a tensile strength of the water-dispersible urethane resin is not more than 10 N/mm$^2$.

18. An ink set comprising:
the ink for inkjet textile printing according to claim 17, and
a pretreatment liquid comprising water and a coagulant.

19. A method for producing a printed item, the method comprising applying the ink for inkjet textile printing according to claim 17 onto a fabric using an inkjet recording method.

* * * * *